United States Patent [19]

McBride et al.

[11] 3,950,571

[45] Apr. 13, 1976

[54] METHOD FOR REHABILITATING SCORED AND MARRED SURFACES

[76] Inventors: La Vaughn R. McBride, 1017 Pacific Ave., Half Moon Bay, Calif. 94019; Jack D. Clark, 1708 Whipple Ave., Redwood City, Calif. 94062; Dale Center, Box 123, Montara, Calif. 94037

[22] Filed: Apr. 1, 1974

[21] Appl. No.: 457,095

Related U.S. Application Data

[62] Division of Ser. No. 279,889, Aug. 11, 1972.

[52] U.S. Cl. .............. 427/142; 427/355; 427/371; 427/386; 427/421; 260/37 EP
[51] Int. Cl.² ........................................... B23P 7/02
[58] Field of Search ................ 117/2 R, 8, 132 BE; 427/142, 277, 386; 428/416; 260/37 EP

[56] References Cited
UNITED STATES PATENTS

| | | | |
|---|---|---|---|
| 317,143 | 5/1885 | Kearsing | 117/8 |
| 2,530,738 | 11/1950 | Spessard | 117/2 R |
| 2,868,767 | 1/1959 | Cyba et al. | 260/33.8 EP X |
| 3,006,877 | 10/1961 | Herzberg | 260/33.8 EP X |
| 3,010,843 | 11/1961 | Eder | 117/8 X |
| 3,199,929 | 8/1965 | McClean et al. | 260/37 EP X |
| 3,314,885 | 4/1967 | Murphy | 252/25 |
| 3,554,958 | 1/1971 | Sandstrom | 260/33.8 EP X |

*Primary Examiner*—Ronald H. Smith
*Assistant Examiner*—Evan K. Lawrence
*Attorney, Agent, or Firm*—Owen, Wickersham & Erickson

[57] ABSTRACT

Metal, carbon, or other original surfaces of articles, such as pneumatic and hydraulic cylinders, having scored or marred surfaces can be rehabilitated by applying to them a composition consisting essentially of a mixture of powdered molybdenum disulfide and epoxy resin, curing the resin, and removing excess material. The coating is as hard as steel, has lubricative action, and can withstand high temperatures.

6 Claims, 1 Drawing Figure

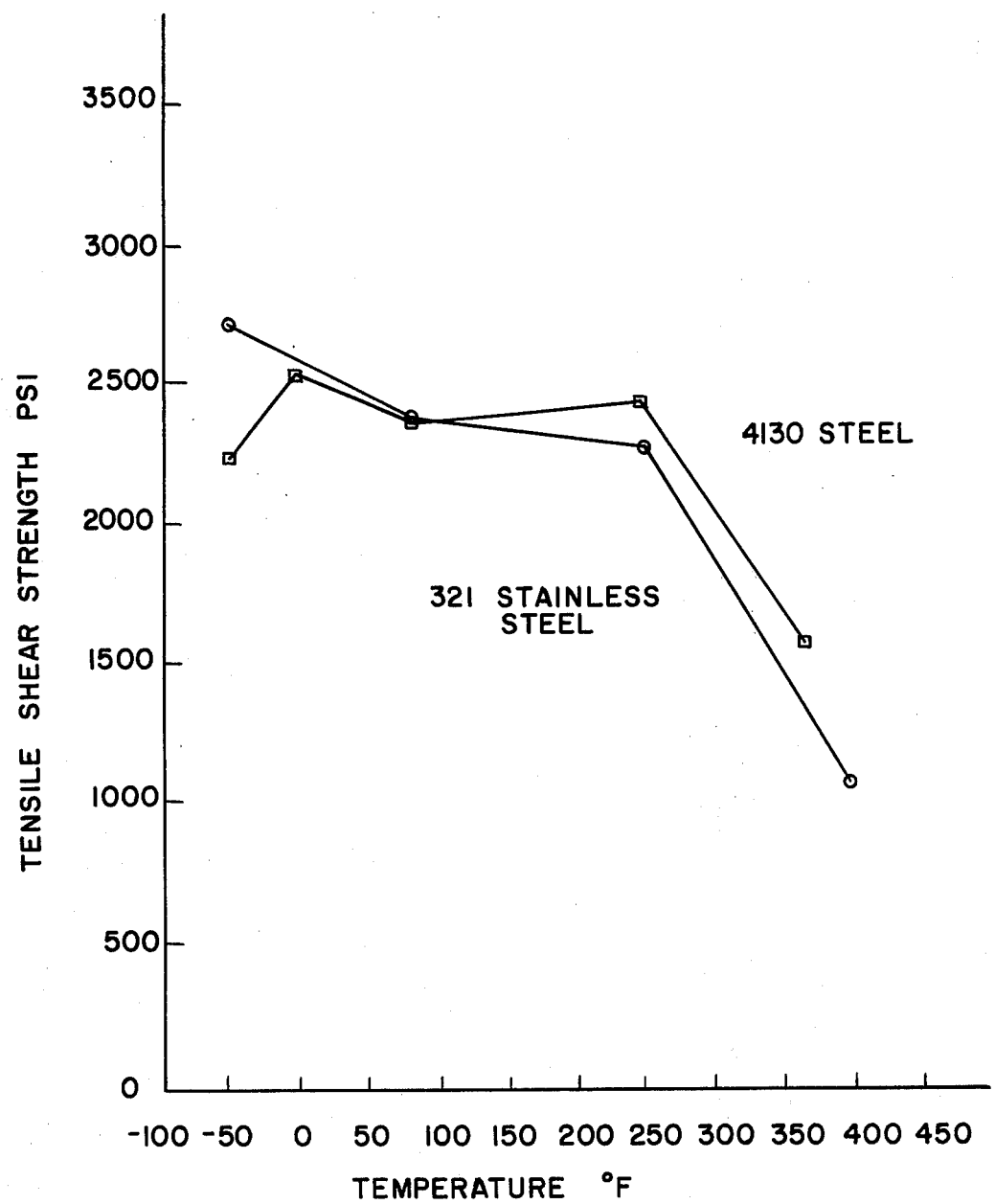

METHOD FOR REHABILITATING SCORED AND MARRED SURFACES

This is a division of application Ser. No. 279,889, filed Aug. 11, 1972.

BACKGROUND OF THE INVENTION

This invention relates to a lubricative coating and filling composition for use in restoring metal surfaces that have been scratched, scored or grooved. It also relates to a method of restoring damaged surfaces.

Heretofore, when metal surfaces were damaged in such apparatus as pneumatic and hydraulic cylinders, they have been difficult to repair, and the repair has been expensive. The usual prior-art process of filling scores and grooves in cylinders and hot castings comprised first, grinding off the damaged surface to the depth of the deepest scores or grooves, then plating the ground-off surface with chromium or nickel, and then regrinding and repolishing the plated surface. Each of these steps was expensive and time-consuming, and the deeper the damage, the more difficult and expensive and lengthy became the repair process.

Siimilar problems were met with bearing journals and bell housings where surfaces had to be built up, and the prior-art practices were equally unsatisfactory there, too.

Attempts have been made to restore such damaged surfaces by using epoxy cements, but the results were unsatisfactory, for they either lacked the necessary lubricative quality or were applicable only in very thin layers — up to a maximum of only about 0.0005 inch.

Objects of the present invention are to provide a more satisfactory and less expensive way of repairing such damaged surfaces and to provide an improved composition and improved method for doing this.

SUMMARY OF THE INVENTION

The composition of the invention consists essentially of a mixture of an epoxy resin and molybdenum disulfide in powdered form. Various proportions can be used in the range of 90% of either ingredient to 10% of the other ingredient, the best results usually being obtained where approximately equal volumes of the two ingredients are used, or a range from 40% epoxy resin and 60% molybdenum disulfide to 60% epoxy resin and 40% molybdenum disulfide these percentages being by volume.

The mixture may be wiped on to the metal surface, or the mixture may be thinned with a suitable volatile solvent and then sprayed on to the metal surface. After the surface has been coated (either by spraying or by wiping on the mixture) such surface is wiped to remove any excess mixture where it extends significantly above the surface level. The solvent, if any, is evaporated. Where the mixture has been sprayed on, the solvent is evaporated prior to wiping. Then the epoxy resin is cured at an elevated temperature. Finally, the surface may be finished by grinding and polishing.

After cure, the material has a Rockwell hardness of mild steel and has also remarkable properties of withstanding high temperatures and considerable mechanical forces. In addition, it provides a lubricating action. Furthermore, it can fill deeper scores and build up greater thicknesses than could prior-art processes.

In addition to replacing the grind-plate-grind process on repairs to sleeving and other expensive repairs for cylinders, shafts, bushings, bearings, and other metal surfaces, the material of this invention is used to fill damaged areas caused by scoring, by scratches, by wear grooves in sealing rings or springs, by fretting, by galling, by corrosion pitting, and so on. It can also be used to renew the sealing surfaces on carbon, Teflon, and metal sealing rings and packing. It can be used to fill various types of voids. It renews and builds up oversized or pitted bearing bores in bell housings, bodies, and so on. It can be used to fill and seal cracks in housings and bodies. It can be used to seal and protect armature and stator windings from oil and other damage.

BRIEF DESCRIPTION OF THE DRAWING

The drawing is a graph showing tensile shear strengths at various temperatures for two different base compositions used in combination with a material embodying the principles of the invention.

DESCRIPTION OF PREFERRED EMBODIMENTS

Powdered molybdenum disulfide of various kinds can be used. One suitable product is "Molykote 2" dry lubricant, a Dow-Corning product, but other molybdenum disulfides are usable. The powder should be fine, preferably with particle sizes no larger than 60 microns diameter.

The epoxy resin, which is a glycidyl polyether of bisphenol A, preferably containing suitable curing agents, such as certain amines, may be chosen from a variety of available materials, with one of the most satisfactory being the proprietary product known as Epon Adhesive 929 manufactured by Shell Chemical Corporation; this is also known as Aerospace Adhesive EA-929, as Hysol Adhesive EA-929 and as ADH 3002-17 made by the Hysol Division of the Dexter Corporation. This material is diglycidyl ether of bisphenol-A and is a fast curing, one pan, yellow-green thixotropic paste with a typical viscosity of 400,000 cps at 75° F. using a Brookfield HBT No. 7 spindle at 20 RPM. The material can contain a small amount of triphenylmethyl phosphonium iodide; and it has a density of 1.4 and a shelf life of several months at up to 75° F. As curing agent there can be used, suitably in admixture with the resin as starting material herein, an amine or hydroxyl curing agent therefor, such agents being well known in this art, both as to kind and amount used. A very satisfactory resin of the type described herein for use as the adhesive agent is a diglycidyl ether of bisphenol-A containing an amine curing agent, the mixture being stable at room temperature but curing quickly upon heating. The recommended cures are for 3 to 4 hours at 250° F, 40 to 80 minutes at 300° F., and 10 to 40 minutes at 400° F. For prolonged storage, the material is preferably kept below 90° F. and even better, below 75° F.

The two materials, the epoxy resin and the molybdenum disulfide powder, may be mixed together in practically any porportions with results that vary somewhat. The results are usually best when the two materials are approximately in equal volumes, but they may be used with as high as 90% by volume epoxy to 10% by volume molybdenum disulfide or with 90% by volume molybdenum disulfide and 10% by volume epoxy resin. For most applications, the preferred range is within 40 to 60% by volume of each ingredient with the balance being the other ingredient.

The material may be wiped on in the viscous paste form but it may also be applied by spray, if desired, by first thinning it with a suitable volatile solvent. Any suitable volatile solvent may be used, but one desired such solvent is known as PT-1001, which is methyl ethylene chloride. Three parts of the thinner to one part paste gives a suitable viscosity for spraying.

The material, especially in paste form, can be built up to any thickness desired and even in spray form it can be built up by correct application technique. It can be built up to a great thickness and may be locally applied instead of applying it over the entire surface of the damaged part. When applied, the material is used to fill all the grooves, scores, and other mars and may, if desired, be wiped off to remove some excess. Then it is cured at the recommended curing temperatures for the epoxy resin, by heating until cure is completed, and the heating may be in an oven or by infrared or by heat applied to the surface in any desired way. After cure, the material may be ground or polished or both to remove any excess remaining. Often, and especially when it has been applied by spraying, no grinding is needed, and even polishing may often be dispensed with.

The cured material has a self-lubricating quality, maintains its adherence under great pressure and temperature, for example 16 tons per square inch, and up to temperatures over 600° F. The material does not soften or dissolve when exposed to hydraulic fluids, including Skydrol, or oils or greases, and it has shown resistance to cleaning solvents, such as Freon, Stoddard's solvent, kerosene, and gasoline. It can be used to build up metal surfaces, as in bearing journals and bell housings and can be applied in many places where plating heretofore has been required, usually saving the grinding and machining process used prior to plating. It can be applied on materials that are not amenable to plating, and the application can be extremely simple and quick, with the setting time brief, depending upon the temperature used.

For best results, a damaged metal surface is prepared before applying the material of this invention by first stripping any protective paint or covering, if there is any. Then the surface is wiped with a suitable solvent to remove greases and dirt, continuing to clean until a solvent moistened cloth shows no residue; vapor degreasing can be used instead. All areas to be filled with the material of this invention should be abraded and cleaned. Grit or vapor blasting can be used, provided the area is solvent cleaned before and after blasting. For aluminum or aluminum alloys, chemical surface treatments are recommended, and such treatments may also be used for corrosion protection of parts subjected to severe moisture environment. Such chemical surface treatments are effected using any suitable method and material as well known in the art of surface treatment of aluminum including aluminum alloys. The material of this invention should be applied within four hours of the completion of preparation, for avoidance of contamination or degradation. The treatment has been found effective for filling scores, grooves, and fretted areas of low-alloy steel, stainless steel and aluminum surfaces subject to sliding friction at temperatures between −40° F. and 400° F. Above 400° F. it is suitable for non-structural repairs.

The uncured material should be used carefully, preferably with gloves, and where skin has been exposed to it, the skin should be washed promptly with soap and water.

The paste may be applied with a spatula and worked into the grooves and fretted areas sufficiently to displace any trapped air and to eliminate any voids from the filler material itself. Masking can reduce clean-up time.

For spraying, the solvent is used to obtain a sprayable viscosity and the surface sprayed. When deep areas are then filled, several layers are sprayed, letting the solvent evaporate between successive applications. After the completion of the spray applications, allow about one-half hour at room temperature for solvent evaporation before curing.

During curing of either the paste or the sprayed material, no pressure is ordinarily required. Before cure, the adhesive mixture may be formed to its final contour.

Typical curing times are 3½ hours at 250° F., 60 minutes at 300° F, and 25 minutes at 400° F. Curing may be done in an oven, and the part is usually allowed to oven-cool from its elevated temperature to near room temperature. Air cooling can be used where thermal expansion differences are no problem. If the coefficients of thermal expansion are quite different, it may be necessary to provide fixtures to hold the parts in position during curing and cooling.

After cure, the part may be burnished or sanded, if needed.

EXAMPLE I

A paste comprising equal amounts by volume of molybdenum disulfide powder (Molykote) and epoxy resin (Epon Adhesive 929) was applied 0.03 inch thick to a metal surface. The area covered was cured for 1 hour at 300° F, and then the material was subjected to a pressure test. This comprised applying a pressure of 4 tons to a surface area ¼ inch in diameter. The material continued to adhere to the metal surface in this area. This same application was given further tests. It was found that the casting stayed intact in Skydrol at 400° F. and that it remained intact in air at temperatures over 600° F. Rockwell hardness tests showed that the material was harder than mild steel.

Various aircraft parts were than covered with this same material, and it gave satisfactory use in practice.

EXAMPLE II

The formula of Example I was varied by using 90% by volume EA 929 and 10% by volume molybdenum disulfide powder. The material still retained its lubricating and hardness quality.

EXAMPLE III

One inch by 4inch by 0.062-inch thick coupons of 321 stainless steel, and 4130 steel were prepared. Surface preparation consisted of spraying the area to be bonded with Freon solvent and then wiping it off with a paper shop towel. A mixture of 50% by volume EA 929 adhesive (Hysol Division, Dexter Corporation) and 50% by volume molybdenum disulfide powder by volume was prepared and was diluted with methylethylene chloride at a ratio of 3 parts methylethylene chloride to 1 part of the mixture. The adhesive was then sprayed on both facing surfaces, and the specimens were immediately assembled in one-half inch overlap configuration, 7.5-inches long and 1-inch wide. After 30 minutes at room temperature to enable evaporation of the methylethylene chloride, the specimens were cured in an oven for 1 hour at 300° F.

After several weeks, the specimens were tested using the procedure specified in ASTM D 1002 with a loading rate of 1200 psi per minute. For −40° F, 0° F, 250°F, 325° F, 365° F. and 400° F. testing, specimens were brought to temperature and stabilized for 5 minutes before testing. Temperature was controlled by adhering a copper-constantin thermocouple to the specimens which, when attached to a West Instruments Controller, automatically stabilized temperature at set-point. It usually took from 10 to 20 minutes to bring the specimen to test temperature.

Four specimens each of the 321, and 4130 alloys were tested at −40° F., 80° F., 250° F., and either 365° F., or 400° F., depending on the alloy. Two specimens each were tested at 0° F. Failure strength was averaged and is shown in Table One. The drawing shows the average failure values versus temperature.

TABLE ONE

TENSILE SHEAR STRENGTH FROM −40°F. to +400°F. OF SPECIMENS BONDED WITH THE MATERIAL OF THIS INVENTION

| PROPERTY/ TEMPERATURE | MATERIAL/TEST RESULTS 321 STAINLESS STEEL | 4130 STEEL |
|---|---|---|
| 1. Tensile Shear Strength (psi) at 80° F. | | |
| A. Average | 2398 | 2382 |
| B. Average mean deviation | 96 | 200 |
| C. Individual test values | 2280 | 2189 |
| | 2353 | 2270 |
| | 2417 | 2354 |
| | 2542 | 2714 |
| D. Failure Mode | 98% cohesive, porous from trapped solvent | 100% cohesive, voids in lap from trapped solvent |
| 2. Tensile Shear Strength (psi) at 250° F. | | |
| A. Average | 2300 | 2468 |
| B. Average mean deviation | 277 | 195 |
| C. Individual test values | 1894 | 2220 |
| | 2250 | 2345 |
| | 2396 | 2600 |
| | 2660 | 2708 |
| D. Failure Mode | 100% cohesive; holes in bond from trapped solvent | 100% cohesive, porous from trapped solvent |
| 3. Tensile Shear Strength (psi) at 400° F. for 321, and 365° F. for 4130 | 400°F. | 365° F. |
| A. Average | 1102 | 1067 |
| B. Average mean deviation | 263 | 314 |
| C. Individual test values | 729 | 1132 |
| | 1020 | 1549 |
| | 1213 | 1768 |
| | 1447 | |
| D. Failure Mode | 95% cohesive | 90% cohesive; solvent trapped in lap-porous bond |
| 4. Tensile Shear Strength (psi) at 0° F. | | |
| A. Average | 2601 | 2552 |
| B. Average mean deviation | 59 | 148 |
| C. Individual test values | 2542 | 2404 |
| | 2660 | 2700 |
| D. Failure Mode | 90% cohesive; porous from trapped solvent | 90% cohesive; porous in lap from solvent |
| 5. Tensile Shear Strength (psi) at −40° F. | | |
| A. Average | 2676 | 2260 |
| B. Average mean deviation | 181 | 336 |
| C. Individual test values | 2431 | 1690 |
| | 2583 | 2392 |
| | 2792 | 2396 |
| | 2895 | 2560 |
| D. Failure Mode | 90% cohesive; porous from trapped solvent | 90% cohesive; bond porous from trapped solvent |

NOTES.
Cohesive Failure indicates failure within the adhesive, as distinct from failure of the adhesive bond to the metal surface.

Test results indicate that bond strengths of 321 stainless steel and 4130 steel are similar. It should be noted that the surfaces to be bonded were very rough, hence a high degree of mechanical adhesion was obtained. Smooth steel surfaces should be solvent wiped, vapor honed or grit blasted and then recleaned with solvent before bonding for optimum adhesion. Since bondline failures of the steel specimens were basically cohesive, these tests appear to measure the "adhesive-ness" of the filler mixture.

While the test results shown in the drawing were below the strength of the unfilled EA 929 adhesive, since the molybdenum disulfide powder has a plasticizing effect on the EA 929 adhesive, the strength of the mixture is adequate for surface filling applications. The trends of the tensile shear versus temperature graphs indicate that, above 500° F., little adhesive strength can be expected. The data sheet for EA 929 also indicates excellent load bearing at 300° F. but erratic performance above 400° F. The mixture of this invention presents a relatively hard wear surface and appeared to elongate very little before failure.

The mixture of EA 929/molybdenum disulfide has a high degree of electrical resistivity. When measured with a Simpson VOM on the most sensitive resistance scale, no needle deflection was noted.

All failed specimens showed some degree of solvent entrapment during cure of the adhesive. This was evidenced by porosity, voids and "worm" holes in the adhesive/surface interface. This indicates that the mixtures should be deposited in layers so as to evaporate the trapped solvent before depositing the next layer of the surface filler.

Tensile shear strength of statically tested 321 and 4130 steel specimens, bonded with a "by-volume" mixture of 50% EA 929 adhesive and 50% molybdenum disulfide powder, appears more than adequate for surface filling applications over the temperature range −40°F. to +400°F. Solvent wipe surface preparation is effective if the adherends already have a rough surface. Grit blasting, vapor honing or chemical etching are recommended as prebonding preparation for smooth surfaces.

EXAMPLE IV

A steel pneumatic cylinder had a 3 inch, 120° circumferential groove filled to a depth of 0.020 to 0.030 inch by the method described in Example I above. This unit, was given approximately 300 hours of service, and the repaired unit still looked good.

EXAMPLE V

A high-pressure modulating shutoff valve honing a steel surface was repaired. Two longitudinal grooves were filled and honed in a 3 inch length, one-half inch width area. Some small surface pits were noted, but the repair looked fairly good after an estimated 2907 hours of service.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A repair process for restoring damaged metal, carbon, or other original surfaces by filling score marks, grooves, and other irregularities in the surface of articles such as pneumatic and hydraulic cylinders without changing the basic dimensions of such articles comprising:

filling all scores, grooves, and surface irregularities of said surface with a mixture of finely powdered molybdenum disulfide and epoxy resin adhesive, wiping the filled surfaces to remove any excess mixture where it extends significantly above the original surface level, and curing said resin at a temperature well above ambient for a time sufficient to complete the cure thereof and provide a material hard as mild steel and resistant to hydraulic fluids, said mixture consisting essentially of from 10% to 90% by volume of said disulfide of particle size no larger than 60 microns and from 90% to 10% by volume of said resin adhesive, said adhesive being a glycidyl polyether of bisphenol-A containing a curing agent and having a Brookfield viscosity of 400,000 cps at 75°F.

2. The process of claim 1 wherein said filling step includes first thinning said mixture with a volatile solvent to a viscosity sufficient for spraying and then spraying the thinned mixture on said surface and into all scores, grooves, and surface irregularities thereof, and evaporating said solvent before said wiping step.

3. The process of claim 1 wherein said curing step is followed by abrading off surplus cured coating to leave the original surface uncoated except where there were said scores, grooves or surface irregularities.

4. The process of claim 1 wherein said surface is steel or stainless steel.

5. The process of claim 1 wherein said mixture consists essentially of from 60% to 40% by volume of said molybdenum disulfide and from 40% to 60% by volume of said adhesive.

6. The process of claim 1 wherein said mixture consists essentially of equal volumes of said molybdenum disulfide and said adhesive.

* * * * *